US006592127B1

(12) United States Patent
Flower et al.

(10) Patent No.: US 6,592,127 B1
(45) Date of Patent: Jul. 15, 2003

(54) AIR PURGED SHAFT SEAL ASSEMBLY

(75) Inventors: Arnold B. Flower, Milton (CA); Bernard Teichroeb, Ingersoll (CA)

(73) Assignee: Phlaver Inc., Oakville (CA)

( * ) Notice: Subject to any disclaimer, the term of this patent is extended or adjusted under 35 U.S.C. 154(b) by 0 days.

(21) Appl. No.: 10/052,402

(22) Filed: Jan. 23, 2002

(51) Int. Cl.$^7$ .............................................. F16J 15/447
(52) U.S. Cl. ...................... 277/413; 277/409; 277/411; 277/412; 285/136.1; 403/34
(58) Field of Search ................. 277/409, 411, 277/412, 421; 285/192, 194, 195, 136.1, 142.1; 403/16, 34

(56) References Cited

U.S. PATENT DOCUMENTS

| | | | | |
|---|---|---|---|---|
| 2,469,588 A | * | 5/1949 | Aschauer ..................... | 285/96 |
| 3,279,804 A | * | 10/1966 | Blair ........................... | 277/380 |
| 4,022,424 A | * | 5/1977 | Davis et al. .................. | 251/214 |
| 4,136,989 A | * | 1/1979 | Bianco ........................ | 403/261 |
| 4,482,194 A | * | 11/1984 | Chambers, Sr. .............. | 277/348 |
| 4,819,950 A | * | 4/1989 | Winslow ..................... | 277/348 |
| 5,069,461 A | * | 12/1991 | Orlowski ..................... | 277/303 |
| 5,161,804 A | * | 11/1992 | Orlowski et al. ........... | 277/378 |
| 5,174,583 A | * | 12/1992 | Orlowski et al. ........... | 277/421 |
| 5,498,006 A | * | 3/1996 | Orlowski ..................... | 277/419 |
| 6,168,163 B1 | * | 1/2001 | Thorson et al. .............. | 277/419 |
| 6,206,378 B1 | * | 3/2001 | Sakata et al. ................ | 277/411 |
| 6,390,477 B1 | * | 5/2002 | Drago et al. ................. | 277/358 |

* cited by examiner

Primary Examiner—Anthony Knight
Assistant Examiner—Christopher Boswell
(74) Attorney, Agent, or Firm—Robert F. Delbridge

(57) ABSTRACT

An air purged shaft seal assembly has a seal housing fixedly securable to a stationary support and having a circular aperture through which a shaft can pass. The seal housing has an internal annular surface defining the circular aperture, the internal annular surface having a first annular portion for engaging an outer surface of an annular sealing member and a second annular portion shaped to partially form an air receiving chamber. The seal housing has a passage for supplying air under pressure from an external source thereof to the air receiving chamber. A sleeve mountable on the shaft for sliding movement therealong, the sleeve having an external peripheral surface with a first peripheral portion co-operable with the first annular portion of the internal annular surface of the seal housing to receive the annular sealing member therebetween and a second peripheral portion co-operable with the second annular portion of the internal annular surface of the seal housing to form the air receiving chamber. A shaft collar surrounds and is fixedly securable to the shaft. Sleeve adjustment means carried by the shaft collar is operable to enable the sleeve to be moved longitudinally on the shaft to adjust the distance between a portion of the seal housing and a portion of the sleeve adjacent the air receiving chamber to provide an adjustable annular gap therebetween to enable air under pressure to escape from the air receiving chamber and prevent foreign matter from passing into the air receiving chamber between the portions of the seal housing and the sleeve adjacent thereto.

2 Claims, 3 Drawing Sheets

AIR PURGED SHAFT SEAL ASSEMBLY

FIELD OF THE INVENTION

This invention relates to air purged shaft seal assemblies for use, for example with mixers and especially mixers which are used to mix abrasive products such as sugar or concrete mixes.

BACKGROUND OF THE INVENTION

It is known to use packing glands or lip seals with or without air purging in shaft seal assemblies, but known shaft seal assemblies of the kind have not proved to be particularly successful in practice because frequent servicing thereof by replacement of warn packing glands or lip seals is required.

It is therefore an object of the invention to provide an air purged shaft seal assembly with improved life before servicing becomes necessary.

SUMMARY OF THE INVENTION

According to the invention, an air purged shaft seal assembly has a seal housing fixedly securable to a stationary support having a circular aperture through which a shaft can pass. The seal housing has an internal annular surface defining the circular aperture, the internal annular surface having a first annular portion for engaging an outer surface of an annular sealing member and a second annular portion shaped to partially form an air receiving chamber, the seal housing having a passage for supplying air under pressure from an external source thereof to an air receiving chamber.

A sleeve is mountable on the shaft for sliding movement therealong, the sleeve having an external peripheral surface with a first peripheral portion co-operable with the first annular portion of the internal annular surface of the seal housing to receive the annular sealing member therebetween and a second peripheral portion co-operable with the second annular portion of the internal annular surface of the seal housing to form the air receiving chamber. A shaft collar surrounds and is fixedly securable to the shaft and means are provided to cause the sleeve to rotate with the shaft and the shaft collar.

The shaft collar carries sleeve adjustment means to enable the sleeve to be moved longitudinally on the shaft to adjust the distance between a portion of the seal housing and a portion of the sleeve adjacent the air receiving chamber to provide an adjustable annular gap therebetween to enable air under pressure to escape from the air receiving chamber and prevent foreign material from passing into the air receiving chamber between said portions of the seal housing and the sleeve adjacent thereto.

DESCRIPTION OF THE DRAWINGS

One embodiment of the invention will now be described, by way of example, with reference to the accompanying drawings, of which.

DESCRIPTION OF PREFERRED EMBODIMENTS

Figure 1:
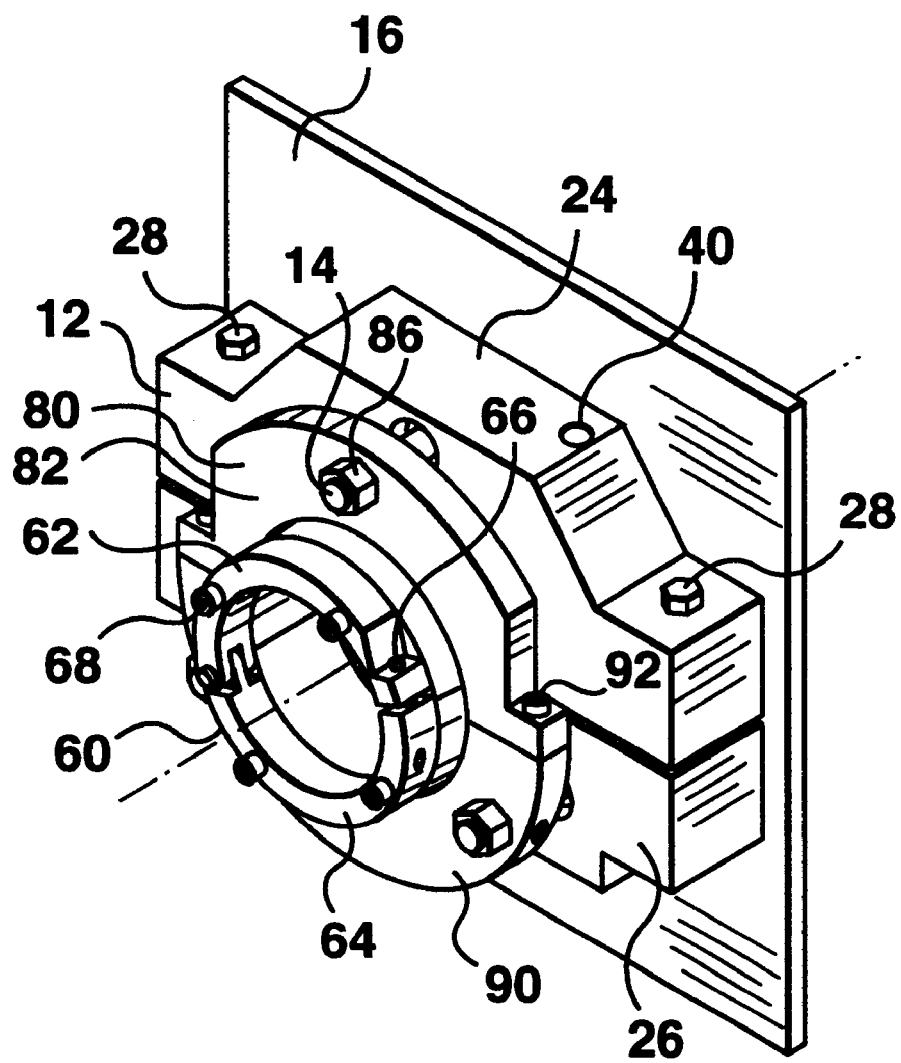
FIG. 1 is a perspective view of an air purged shaft seal assembly in accordance with one embodiment of the invention secured to a stationary support.

Referring to the drawings, an air purged shaft seal assembly has a seal housing 12 fixedly secured by studs 14 and nuts 15 to a stationary support 16 (which may be a side wall of a mixer). The seal housing 12 has a circular aperture 18 to which a shaft 20 (which may be a mixer shaft) passes. The stationary support 16 also has a circular aperture 22 through which the shaft 20 passes. The seal housing 12 may be made in two halves 24, 26 securable together by bolts 28 for ease of assembly around the shaft 20.

The sealing housing 12 has an internal annular surface 30 defining the circular aperture 18. The internal annular surface 30 has a first annular portion 32 for engaging an outer surface of an annular sealing member in the form of packing 34 and a second annular portion 36 shaped to partially form an air receiving chamber 38. The seal housing 12 has a passage 40 for supplying air under pressure from an external source thereof (not shown) to the air receiving chamber 38.

A sleeve 42 is mounted on the shaft 20 for sliding movement therealong. The sleeve 42 has an external peripheral surface 44 with a first portion 46 co-operable with the first annular portion 32 of the internal annular surface 30 of the seal housing 12 to receive the packing 34 therebetween, and a second portion 48 co-operable with the second annular portion 36 of the internal annular surface 30 of the seal housing 12 to form the air receiving chamber 38. The sleeve 42 may also be formed in two halves 50, 52 securable together by bolts 54 for ease of assembly on the shaft 20. The internal surface of the sleeve 42 carries two sealing rings 56, 58 which sealingly engage the shaft 20.

A collar 60 surrounds and is fixedly secured to the shaft 20, the collar 60 being made in two halves 62, 64 securable together so as to be clamped to the shaft 20 by bolts 66. A circumferencially extending series of bolts 68 passing through collar 60 are received in threaded bores 70 in the sleeve 42. Since the collar 60 is fixed on the shaft 20, adjustment of the bolts 68 moves the sleeve 42 along the shaft 20. The bolts 68 also cause the sleeve 42 to rotate with the shaft 20 and the collar 60.

Movement of the sleeve 42 along the shaft 20 by adjustment of the bolts 68 adjust the distance between a surface 72 of the seal housing 12 and a surface 74 of the sleeve 42 to provide an adjustable annular gap 76 therebetween. Each surface 72, 74 may be inclined at an angle of about 45° to the longitudinal axis of the shaft 20.

The shaft seal assembly also includes a sleeve collar 80 slidably mounted on the sleeve 42 and having a first portion 82 which extends between the sleeve 42 and the first annular portion 32 of the inner annular surface 30 of the seal housing 12 to engage the packing 34. The sleeve collar 80 also has a rear flange portion 84 which studs 14 extend from the stationary support 16. Nuts 86 on studs 14 can be tightened to cause the sleeve collar 80 to engage and compress the packing 34 so that it effectively seals the space between the sleeve 42 and the seal housing 12. The sleeve collar 80 can also be made in two halves 88, 90 securable together by bolts 92 for ease of assembly.

Figure 2:
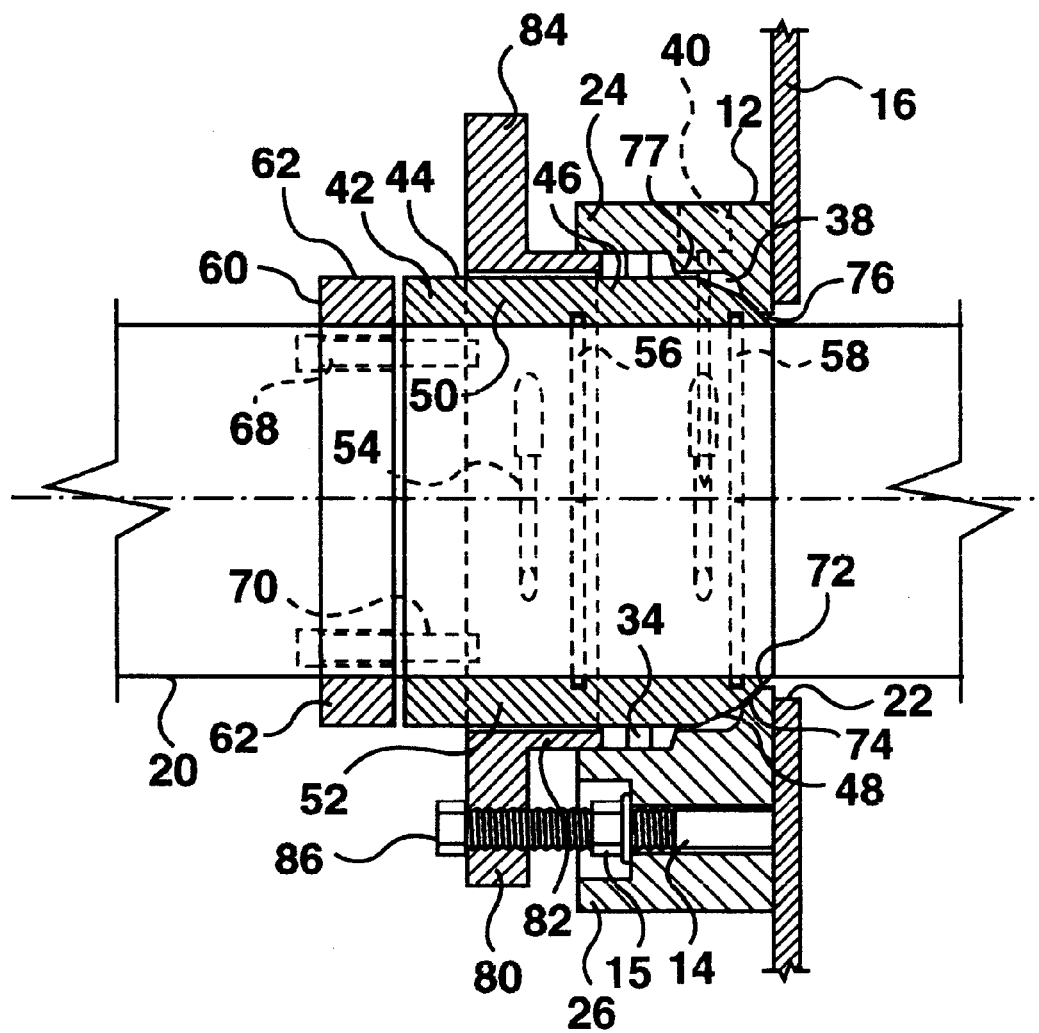
FIG. 2 is a longitudinal sectional view of the shaft seal assembly and stationary support of FIG. 1, with a shaft also being shown.
Figure 3:
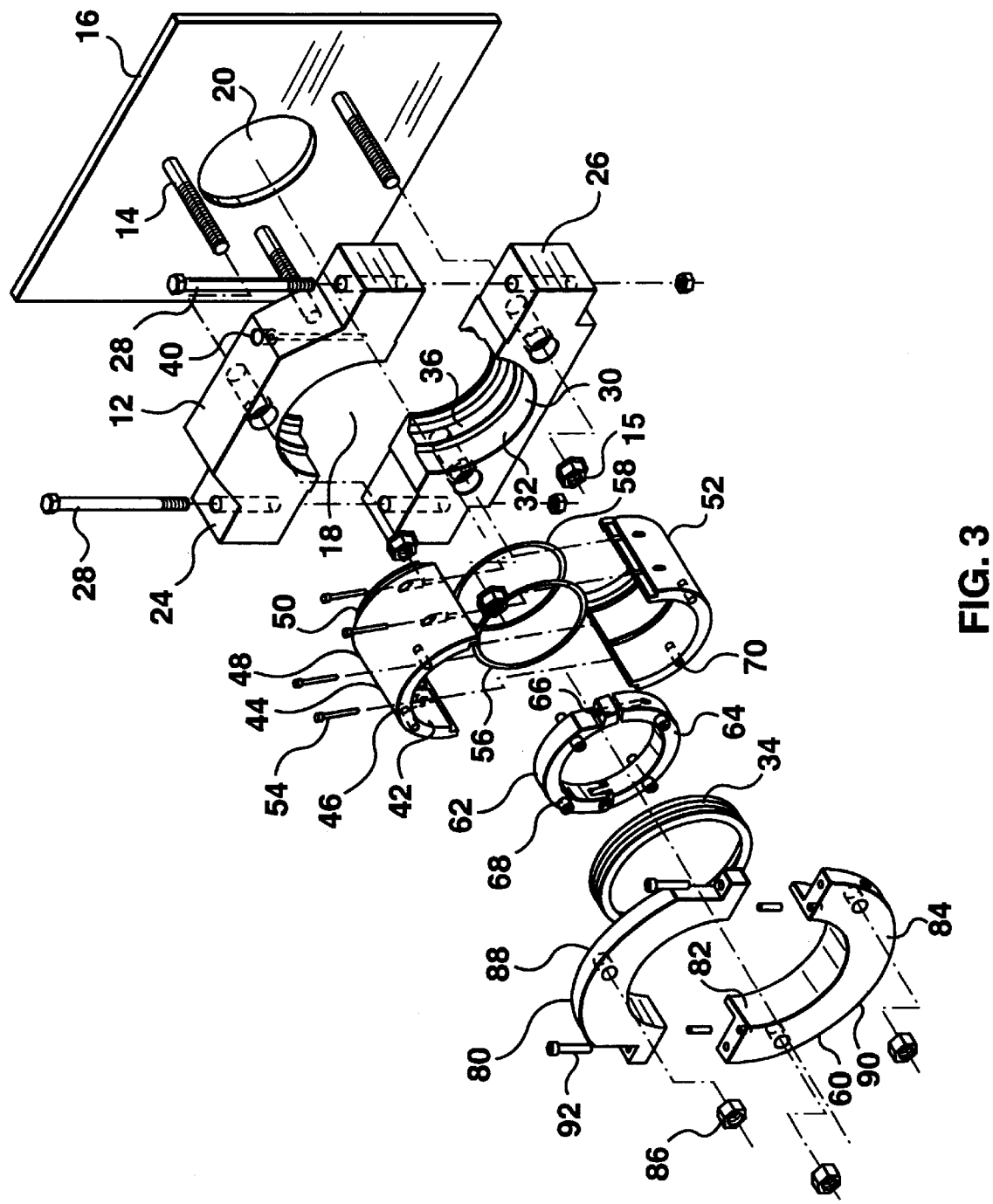
FIG. 3 is an exploded perspective view of the shaft seal assembly and stationary support.

As previously mentioned, the stationary support 16 may be the side wall of a mixer and the shaft 20 may be a mixer shaft which is rotated by a motor (not shown) connected to the left hand end of the shaft (as soon in FIG. 2), the right hand end carrying mixing blades (not shown). The purpose of the air purged shaft seal assembly is to prevent material being mixed from passing through the aperture 22 in the stationary support 16 between the edge of the aperture 22 and the shaft 20. In use, air under pressure is supplied from a suitable external source through the passage 40 in the seal housing 12 to the air receiving chamber 38. The packing 34 prevents air escaping through a further annular gap 77 from the chamber 38 in a rearward direction, so that air in the chamber escapes therefrom through the gap 76 between the seal housing 12 and the sleeve 42 which is fixedly and sealingly secured the shaft 20.

Material being mixed is thus prevented from escaping from the mixing vessel between the seal housing 12 and the sleeve 42 by the flow of air in the opposite direction from the air receiving chamber 38.

The gap 76 may for example be about 0.005 inches, and the air pressure may such as to provide an air flow of about 2 to 2.5 scfm through the gap 76, with the air pressure required being not more than 10 psi.

The advantages of the invention will now be relatively apparent to a person skilled in the art from the foregoing description of a preferred embodiment. Other embodiments will also now be readily apparent, the scope of the invention being defined in the appended claims.

What is claimed is:

1. An air purged shaft seal assembly having:

a seal housing fixedly securable to a stationary support and having a circular aperture through which a shaft can pass, the seal housing having an internal annular surface defining the circular aperture, the internal annular surface having a first annular portion for engaging an outer surface of an annular sealing member and a second annular portion shaped to partially form an air receiving chamber, the seal housing having a passage for supplying air under pressure from an external source thereof to the air receiving chamber, a sleeve mountable on the shaft for sliding movement therealong, the sleeve having an external peripheral surface with a first peripheral portion co-operable with the first annular portion of the internal annular surface of the seal housing to receive the annular sealing member therebetween and a second peripheral portion co-operable with the second annular portion of the internal annular surface of the seal housing to form the air receiving chamber, a shaft collar surrounding and fixedly securable to the shaft, means operable to cause the sleeve to rotate with the shaft and shaft collar, and sleeve adjustment means carried by the shaft collar to enable the sleeve to be moved longitudinally on the shaft to adjust the distance between a portion of the seal housing and a portion of the sleeve adjacent the air receiving chamber to provide an adjustable annular gap therebetween to enable air under pressure to escape from the air receiving chamber and prevent foreign matter from passing into the air receiving chamber between said portions of the seal housing and the sleeve adjacent thereto.

2. A shaft seal assembly according to claim 1 wherein said sleeve adjustment means comprises bolts extending from the shaft collar to the sleeve, and said bolts also form said means to cause the sleeve to rotate with the shaft and shaft collar.

* * * * *

UNITED STATES PATENT AND TRADEMARK OFFICE
CERTIFICATE OF CORRECTION

PATENT NO.    : 6,592,127 B1
DATED         : July 15, 2003
INVENTOR(S)   : Arnold B. Flower and Bernard Teichroeb It is certified that error appears in the above-identified patent and that said Letters Patent is hereby corrected as shown below:

<u>Title page,</u>
Item [73], Assignee, should read -- Assignee:  Phlauer Inc., Oakville (CA) --

Signed and Sealed this

Twenty-first Day of October, 2003

JAMES E. ROGAN
*Director of the United States Patent and Trademark Office*